D5-53 EX

D5379 XR RE 24,139

April 10, 1956 S. J. JAMISON ET AL Re. 24,139

NONCORRUGATING FABRIC

Original Filed June 18, 1951

INVENTORS:
FRED YATES.
SAMUEL J. JAMISON.
BY Arnold L. Wonfeld
ATTORNEY.

United States Patent Office

Re. 24,139

Reissued Apr. 10, 1956

24,139

NONCORRUGATING FABRIC

Samuel J. Jamison and Fred Yates, Springfield, Mass., assignors to Chicopee Manufacturing Corporation, a corporation of Massachusetts Original No. 2,691,391, dated October 12, 1954, Serial No. 232,141, June 18, 1951. Application for reissue January 26, 1956, Serial No. 561,707

2 Claims. (Cl. 139—426)

Matter enclosed in heavy brackets [ ] appears in the original patent but forms no part of this reissue specification; matter printed in italics indicates the additions made by reissue.

This invention relates to a low-count [cross] woven textile *diaper* fabric whose warp yarns are twisted according to a plan which prevents formation of corrugations in the fabric when subjected to laundering in a washing machine, and to the method of twisting the warp yarns.

A low-count woven fabric is one in which the shrinkage forces released on wetting are dissipated by systematized local compensating disturbances and consequently not transmitted throughout the entire fabric structure, as is the case in a stiffened fabric or in a high-count fabric. Ordinary low-count fabrics of this type, woven of yarns spun of swellable staple fibers and whose twist multipliers are not greater than 4.75, will corrugate when subjected to modern laundering techniques as in a modern washing machine and then dried. These corrugations appear as a systematic series of waves running almost entirely in one dimension of the woven fabric, giving a pronounced parallel rutted effect thereto.

In explanation of this phenomenon, when a low-count woven fabric is thoroughly wet-out in water and in the absence of violent agitation, a normal shrinkage reaction occurs. Each fiber and each yarn within the structure swells and the potential energy imparted to the fabric in its manufacturing processes is converted into kinetic energy. The swelling of the members within the fabric structure and the conversion of potential energy in the fabric to kinetic energy (evidenced by motion) must be compensated for by a reorientation of the entire fabric structure through one means or another. In a low-count fabric as it has been defined, the reorientation usually manifests itself by the component yarns assuming a more pronounced crimp and drawing themselves closer to one another. Such normal shrinkage reorientation is relatively gradual and occurs in ordinary laundering of the textile article during the first few washings.

It is believed, however, that when a low-count woven textile article is laundered by techniques involving high centrifugal and tumbling forces the shrinkage reaction is relatively violent. The reorientation of the fabric structure, as its components swell and its kinetic energy is released, must take place so rapidly that the fabric structure, in order to accomodate such reorientation, is put under great stress. The yarns for the most part are unable to assume greater crimp or draw themselves closer together at the rate required to dissipate the released shrinkage forces by the simple process of reorientation already described. The friction points at the yarn crossings frequently will not yield to allow the yarns to draw closer together, and the same length of the now swollen yarn must, instead, yield in the span of the yarn between friction points to accommodate the yarns in their closer proximity which results from their swelling action.

Consequently the entire fabric structure buckles locally at many of these spans throughout the material. It has been observed that the buckling occurs systematically, forming crests and troughs in the fabric running in one direction of the fabric. The buckled spans occur relative to one another in the structure in what appears to be almost sine-wave precision. The crests and troughs are of relatively high amplitude and line up in generally parallel disposition relative to one another usually spaced with a fraction of an inch between adjacent furrows.

One of the objects of the present invention is to provide a low-count woven textile article that will lay flat without corrugations after it has been laundered by techniques involving high centrifugal and tumbling forces.

The invention lies in a low-count woven fabric structure that will randomize the dissipation of shrinkage forces locally as these forces are released on laundering even with high centrifugal or tumbling-type washing machines. It is thus possible to avoid a pronounced and systematic buckling of the fabric structure itself and the fabric will lay flat. By reversing the twist spun into one out of every two to four warp yarns in the fabric so that they are of opposed twist to the other warp yarns, and by weaving the fabric of yarns having a twist multiplier no greater than 4.75, it has been found that corrugations do not occur in such low-count woven fabrics under the most violent laundering conditions. This is probably because with such fabric construction the release of shrinkage forces occurs geometrically haphazardly. The haphazard release of forces prevents the buckling of the fabric structure according to any systematic pattern. Because of this haphazard release of forces, there is no organized coaction of forces to create periodic furrows. The preferred fabric structure of this invention is a low-count woven fabric of yarns whose twist multiplier is less than 4.75 with alternate warp yarns having a twist directionally opposed to the twist in the remainder of the warp yarns and the weft yarns being of unidirectional twist.

The invention will be explained, by way of illustration, as it applies to a simple low-count woven textile article such as a cotton diaper *fabric. Such low-count diaper fabrics are known as gauze diaper fabrics and have been made commercially, by way of example, with thread-count ranging from 39 to 46 in the warp and from 35 to 40 in the weft, and with yarn sizes ranging from 25s to 35s in the warp and from 22s to 45s in the weft.*

Figure 1:
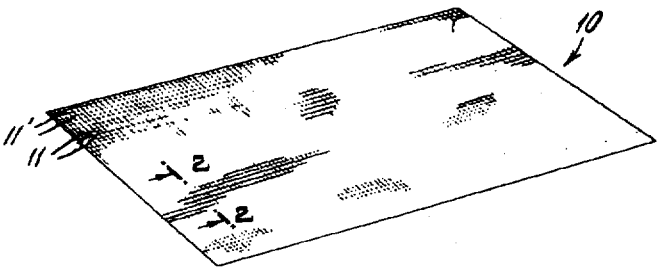
Fig. 1 is a perspective view of a rectangle of low-count woven textile [material such as a] diaper *fabric* made according to the invention after it has been washed and dried by modern automatic laundering techniques.
Figure 2:
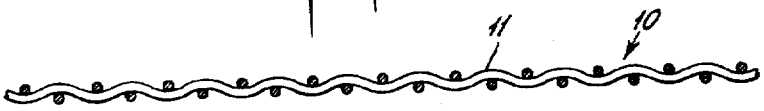
Fig. 2 is [of] an enlarged partial section at line 2—2 of Fig. 1.

Referring to Figs. 1 and 2, there is shown [a] *one ply 10 of a two-ply* cotton diaper [10] woven with alternate warp yarns 11 having a right-hand twist and the remainder of the warp yarn 11' having a left-hand twist. [Diaper 10 is made of two plies] *Each ply 10 of the two-ply diaper is made* of low-count fabric (that is, a fabric in which the shrinkage forces released on wetting are dissipated by local compensating disturbances, and consequently not transmitted throughout the entire fabric structure). All of the warp and weft yarns in the fabric are spun with twist multipliers no greater than 4.75. With this type of fabric, there is no apparent corrugation in the fabric structure after laundering by methods involving violent agitation and then drying. This type of fabric construction is capable of randomizing the dissipation of the shrinkage forces without patterned corrugations even when such forces are released at unusually high rates. As shown in Fig. 1, diapers of this construction will lay flat.

To be more specific, and by way of example only, a cotton diaper *fabric* was woven with a warp yarn number of 25s and the weft yarn number of 35s. The weft yarns were spun with a twist multiplier of 3.75 left-hand. Alternate warp yarns had a twist multiplier of 4.25 right-hand, and the others a twist multiplier of 4.25 left-hand. The resulting fabric was cut into rectangular diapers of 40 inches by 21 inches. The diapers were laundered in an automatic washing machine having a washing wheel that carried the diaper from the bottom of the bath to a height of 27 inches whereupon the diaper dropped by gravity to the bottom of the bath. The washer wheel rotated at 36 revolutions per minute. The diaper was subjected to the violent tumbling action thereby created for a period of 60 minutes at each laundering and then dried. The test was repeated thirty times. As shown in Fig. 2, no noticeable corrugations occurred after each laundering and drying test.

Figure 3:
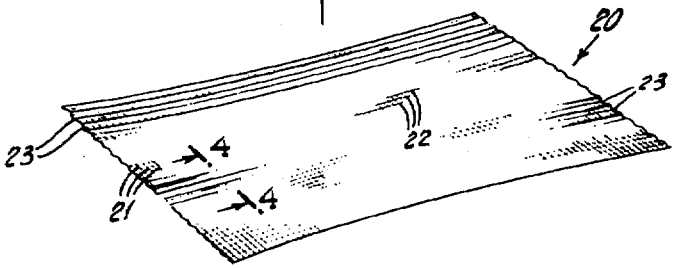
Fig. 3 is a perspective view of a rectangle of *a* conventional low-count woven textile [material such as a] diaper *fabric* after it has been washed and dried by modern automatic laundering techniques.
Figure 4:
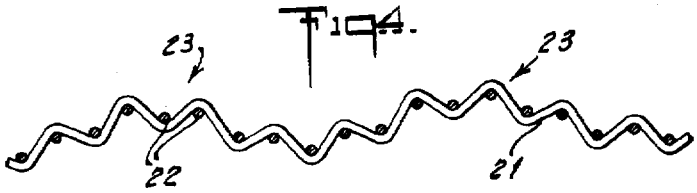
Fig. 4 is [of] an enlarged partial section at line 4—4 of Fig. 3.

As a control, the identical test was made on a diaper 20 such as that shown in Figs. 3 and 4 having warp yarns 21 and weft yarns 22, the yarns count, yarns number, and twist multipliers being the same as in the improved diaper previously described; except that all of the yarns in this diaper were spun with a left-hand twist. At the end of each laundering test, under the same conditions as before, the diaper had a series of deep periodic corrugations 23 (Fig. 4).

The invention has been described with reference to one embodiment thereof but many modifications are included within its spirit. It is to be limited, therefore, only by the scope of the appended claims.

The invention claimed is:

*1.* An unstiffened low-count, [cross] woven *diaper* fabric having all of its yarns possessing a twist multiplier no greater than 4.75 and wherein the shrinkage forces released on wetting are dissipated by local compensating disturbances and not transmitted throughout the entire fabric, said fabric having 25 to 50 per cent of its warp yarns possessing a twist reverse from that of the remainder of the warp yarns and distributed throughout the fabric in a manner sufficiently regular to prevent corrugation when the fabric is laundered by techniques involving high centrifugal and tumbling forces.

*2. In a gauze diaper comprising a plurality of plies of fabric, the improvement according to which said fabric is an unstiffened low-count woven diaper fabric having all of its yarns possessing a twist multiplier no greater than 4.75 and wherein the shrinkage forces released on wetting are dissipated by local compensating disturbances and not transmitted throughout the entire fabric, said fabric having 25 to 50 per cent of its warp yarns possessing a twist reverse from that of the remainder of the warp yarns and distributed throughout the fabric in a manner sufficiently regular to prevent corrugation when the fabric is laundered by techniques involving high centrifugal and tumbling forces.*

References Cited in the file of this patent or the original patent

UNITED STATES PATENTS

| | | |
|---|---|---|
| 889,827 | Teufel | June 2, 1908 |
| 2,081,370 | Secrist | May 25, 1937 |
| 2,215,938 | Schonholzer | Sept. 24, 1940 |
| 2,400,276 | Whitman | May 14, 1946 |